July 27, 1926.
T. G. O. HYDÉN ET AL
1,593,696
METHOD OF AND MEANS FOR MANUFACTURING BODIES OF EXTENDED SHAPE
FROM A PLASTIC MATERIAL, AS CONCRETE OR THE LIKE
Filed March 18, 1924   2 Sheets-Sheet 2
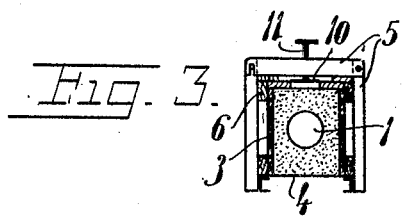
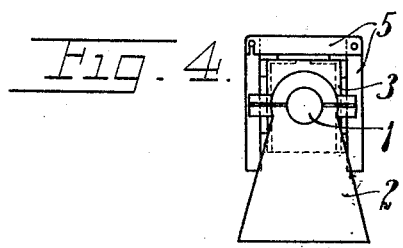
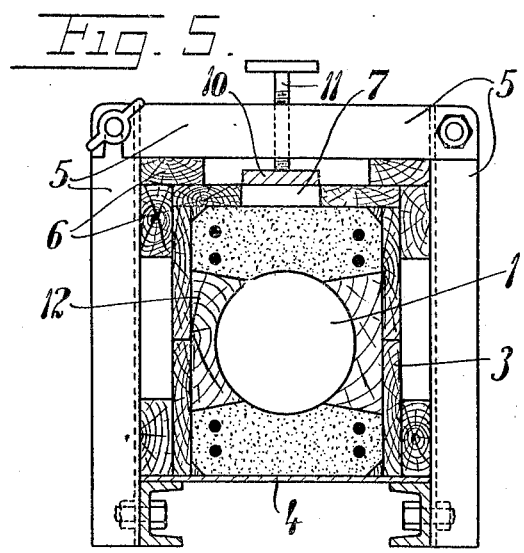
Inventors:
Tore G. O. Hydén
Erik V. Carlsson,
By Henry Orth Jr   Atty Patented July 27, 1926.

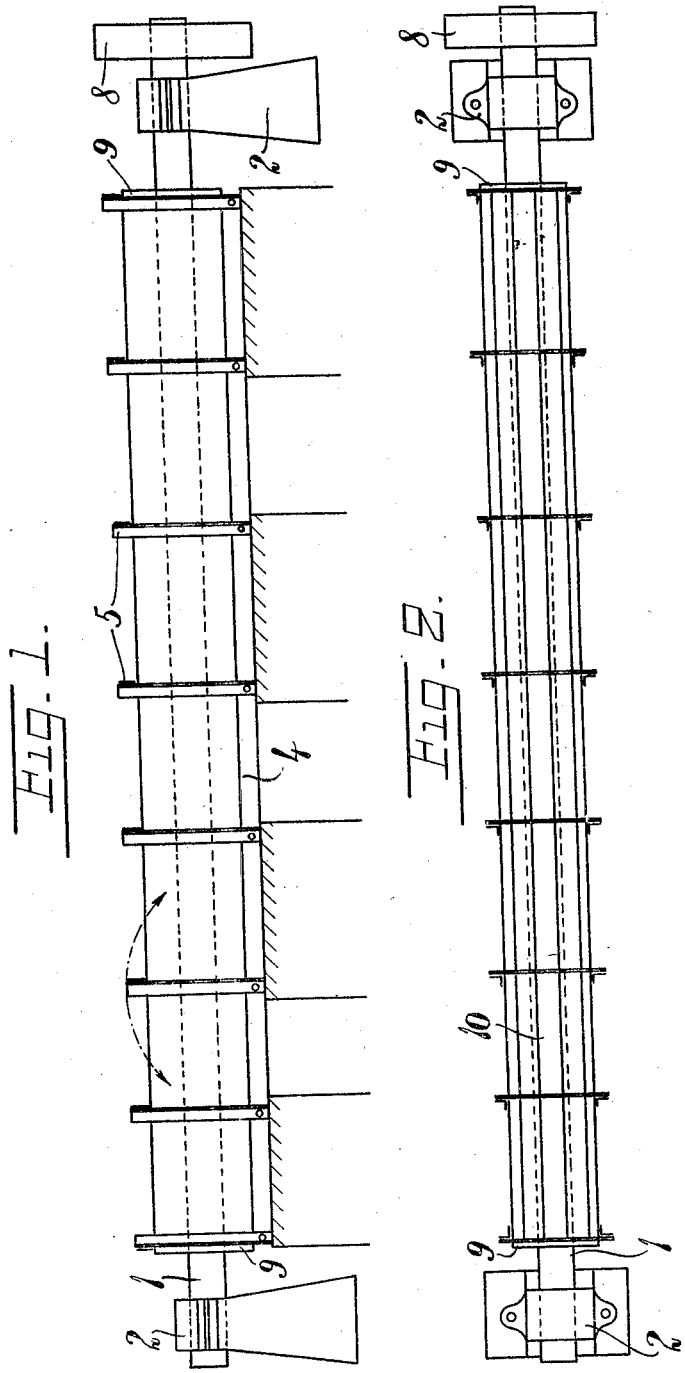

1,593,696

UNITED STATES PATENT OFFICE.

TORE GUSTAF OLOF HYDÉN, OF STOCKHOLM, AND ERIK VALDEMAR CARLSSON, OF NYKOPING, SWEDEN.

METHOD OF AND MEANS FOR MANUFACTURING BODIES OF EXTENDED SHAPE FROM A PLASTIC MATERIAL, AS CONCRETE OR THE LIKE.

Application filed March 18, 1924, Serial No. 700,022, and in Sweden March 28, 1923.

This invention relates to the manufacture of bodies of extended shape, as pipes or tubes, poles or the like, from a plastic material, as concrete. The object of this invention is to provide a new method of and apparatus for manufacturing such bodies in a more simple and efficient way than that hitherto used.

In the manufacture of hollow bodies of extended shape it is already known to use a mould with a through extending core. In such moulding operations as hitherto carried out, however, special means must be provided in order to effect a ramming action on the mass, when such an action is desired. According to our invention such special means may be dispensed with by effecting a relative movement of the mould and the core with respect to each other during the filling in of the mass into the mould as well as during an appropriate period of time after said filling operation has been completed.

The method according to the present invention consists in putting the plastic material, as a mass of concrete or the like, into the space between a substantially horizontal core and a surrounding mould, which may contain reinforcement metal, through a longitudinally extending opening while maintaining the core or/and the mould in a relative movement with respect to each other either in the same direction or in opposite directions in order to cause the plastic material due to the friction with the moving member or members to successively fill the mould completely, whereupon said relative movement is continued in order to produce further friction between the mass and the moving member or members as well as between the particles of the mass themselves for preparing and densifying the mass. After the said space is completely filled with plastic mass and the desired degree of density of the mass is obtained, the relative movement of the mould and the core is stopped and the mass is allowed to set.

In the accompanying drawings, Figs. 1–4 illustrate diagrammatically an apparatus for carrying the process according to the invention into effect.

Fig. 1 is a side elevation, Fig. 2 is a top plan view, Fig. 3 is a cross section, and Fig. 4 is an end view of said apparatus.

Fig. 5 shows a cross section of a modified embodiment of the apparatus. Fig. 6 is a side elevation of a post manufactured by means of the apparatus shown in Fig. 5.

The apparatus illustrated in Figs. 1–4 is adapted for use in the manufacture of hollow bodies of extended shape having a rectangular cross section. Said apparatus comprises a cylindrical core 1, resting in a substantially horizontal direction in bearings 2, and an internally rectangular mould 3 surrounding the core so as to form a space thereabout. The mould 3 is supported by a base structure 4. Pivotally connected to the sides of said base structure to turn lengthwise of the mould are a number of frames 5, each comprising two side members pivoted to the base and a transverse top member pivoted to one of the side members and detachably connected to the other side member, so that it may be released from the said last-mentioned member and turned up to leave the upper surface of the mould free. When assembled, the frames 5 with the base structure 4 will positively embrace the mould and hold same together. The mould is, namely, composed of a plurality of parts so that it may be readily mounted and dismounted. The mould is formed at its top with a longitudinally extending opening or a series of openings situated after each other in the longitudinal direction of the mould to enable the introduction of the plastic mass along the whole length of the mould.

The core 1 is provided with means, as a toothed gear, a belt pulley, or the like 8, to impart power to the core to rotate same. The space between the core and the mould is closed at its ends by suitable covers 9.

The plastic mass, as concrete, is put into the mould through the opening 7, while the core 1 is rotated. Due to the movement of the core the mass is uniformly distributed in the space between the core and the mould so as to completely fill said space. The said movement will also give rise to frictions which will produce a relative movement of the particles of the mass with respect to each other whereby an effective mixing of the particles and a high degree of density of the mass will be obtained. After the said space is completely filled and the mass is sufficiently prepared the material in excess is drawn off at the opening 7 which may thereupon be closed by a cover 10 held in place by means of screws or the like 11 carried by the uppermost frame portion 5. By depressing said cover 10 by screwing down the screws 11 a compression of the mass may also be effected, if necessary. The mass is then allowed to set and after the setting operation is completed the core is withdrawn and the mould dismounted and removed.

To enable the removal of the mould from the body moulded the screws 11 and the uppermost frame members 5 are released and the frame members folded up, whereupon the cover may be removed and the mould, which may be in sections both in the longitudinal and the lateral directions, dismounted.

The apparatus may be modified in several respects without departing from the principles or scope of the invention.

The cross section of the mould need not be rectangular but may be of any shape desired, as square, cylindrical or oval. Also the cross sectional dimensions of the space between the mould and the core may vary at different points, and may, for instance, increase or decrease successively towards one end. The core need not be cylindrical but may, if desired, be conical. The core may be held against movement and the mould be rotated, or both the core and the mould may be rotated either simultaneously or separately in the same direction or in opposite directions. In order to facilitate the transport of the apparatus the base structure 4 may also comprise a plurality of sections.

The apparatus may also be designed so that the bodies to be moulded will show openings in their sides. To this end blocks are placed into the space between the core and the mould. Fig. 5 shows a cross section of an apparatus for manufacturing hollow bodies having a rectangular cross section with openings formed in its two opposite widest surfaces. The body is shown in elevation in Fig. 6. All the four surfaces of the body are tapering towards the top thereof.

With reference to Figure 5, the numeral 1 represents the core which is assumed to be conical. 4 is the base plate of the base structure supporting the mould and the frames for holding the mould in place. The numeral 3 designates the mould. Inserted between the mould 3 and the side portions of the frame 5 are space members 6. 7 is the opening at the top of the mould and 10 is the cover therefor with its controlling screw 11. 12, 12 are blocks inserted to form the openings in the sides of the post. Said blocks fill completely the space between the mould and the core at those points where they are situated. The blocks may either be placed at a certain distance from each other as seen in the longitudinal direction of the apparatus along the whole length thereof or at suitable separate points thereof. The base plate 4 is tapering towards one end to answer to the tapering of the side and top walls of the mould.

Through the opening 7 the plastic material is put in while the core is rotated. Due to this rotation the material is caused to fill the mould completely and is effectively rammed and prepared. When this action is considered to be sufficient, the movement is stopped and the filling opening covered, and the screws 11 tightened, if necessary, to cause the cover 10 to effect a still higher compression of the mass.

The blocks 12 are rigidly connected to the side walls of the mould so as to be held against movement during the rotation of the core. The blocks also serve as bearing blocks for said core during the rotation thereof. The blocks are preferably tapering both in the lateral and longitudinal directions in order to enable a ready removal from the moulded body.

The finished body or pole thus produced will show a series of openings 13 at two opposite faces, one of which is shown in Fig. 6. The position of the blocks 12 may be chosen so that the openings produced by the blocks may serve as steps in climbing the post. The openings may also be used for attaching the pole equipment.

The pole shown in Fig. 6 is only chosen as an example and the invention is not restricted to the manufacture of this special type of poles. The cross sectional shape of the pole and the position of the blocks 12 for supporting the core may be varied at will. For instance, the blocks may be substituted by bolts or the like attached to or carried by the reinforcement metal to support the core. In such a case said bolts will, of course, remain in the finished body which will thus show an unbroken outer surface.

The core and the mould may have any suitable cross section desired.

Reinforcement metal of any kind may be placed in the space between the core and the mould prior to the moulding operation.

As plastic mass any composition may be used provided it is capable of getting solid and setting when it is left unmoved.

What we claim as new is:—

1. A method of manufacturing hollow bodies of extended shape from a plastic material which consists in imparting a rotary motion to a substantially horizontal cylindrical smooth core within a substantially horizontal mould, introducing the plastic mass through an opening at the upper part of said mould upon the upper part of the rotating core, substantially along the full length thereof, maintaining a slow rotation of the core so as to effect a complete and proper distribution of the plastic material to all parts of the hollow space between the core and the mould, discontinuing the rotation of the core when said distribution is completed and the material is compressed to the desired density, allowing the mass to set sufficiently, and thereafter withdrawing the core.

2. A method of manufacturing hollow bodies of extended shape from a plastic material which consists in imparting a rotary motion to a substantially cylindrical smooth core within a substantially horizontal mould, introducing the plastic mass through an opening at the upper part of said mould upon the upper part of the rotating core substantially along the full length thereof, maintaining a slow rotation of the core so as to effect a complete and proper distribution of the plastic material to all parts of the hollow space between the core and the mould, reversing the direction of said rotation a number of times, discontinuing the rotation of the core when said distribution is completed and the material is compressed to the desired density, allowing the mass to set, and thereafter withdrawing the core.

3. In the manufacture of hollow bodies of extended shape from plastic material in a substantially horizontal mould the method of preventing segregation of the ingredients of the plastic material which consists in maintaining a rotation of a smooth, substantially cylindrical core inside said mould, introducing said material during said rotation through a longitudinal opening at the upper part of mould upon the upper part of said rotating core along substantially the whole length of the mould, adjusting said rotation and said introduction relatively to each other in such a way as to cause the friction between the rotary core and said material to distribute the material to all parts of the hollow space between the hollow mould and the core, at the same time causing a working of the material due to the resistance to the movements of the material imposed by the friction against the inside space of the mould and any reinforcement placed in the space between the mould and the core.

4. A method of manufacturing hollow bodies of extended shape from a plastic mass which consists in introducing the plastic mass through an opening substantially along the whole length of a substantially horizontal mould containing a smooth rotating core, distributing said mass in the space between said mould and core by the frictional contact between said mass and the smooth surface of said core produced by rotating said core relatively to said mould, preventing ingredients of the mass from separating during the introduced period by continuing the mixing action produced by the adhesion between the mass, the sides of the mould and the surface of the core, compressing the mass by prolonging the relative rotary movement after the space between the mould and the core has been filled until the desired density has been obtained, then stopping said relative motion, and allowing the mass to set.

5. A method of manufacturing hollow bodies of extended shape from a plastic material, which consists in introducing the plastic material through an opening along the top of a substantially horizontal mould upon the top of a substantially horizontal core within said mould, distributing the mass to all parts of the space between said mould and said core by maintaining a relative rotary motion between the core and the mould during the introducing period, at the same time insuring a perfect mixture, compressing the mass to the desired density by prolonging the relative motion between the core and the mould, then stopping the motion and allowing the mass to set.

6. A method of manufacturing hollow bodies of extended shape from a plastic material consisting of introducing the plastic material through the opening along the top of the substantially horizontal mould upon the top of a substantially horizontal core, distributing the mass to all parts of the space between said mould and said core placed within said mould by maintaining a relative rotary motion between the core and the mould during the filling period, reversing the direction of the rotation at certain intervals whereby any reinforcement case placed in said space between said mould and said core will be centralized about the rotating core due to the frictional forces between the case and the mass.

7. An apparatus for manufacturing hollow bodies of extended shape from a plastic material, comprising in combination a substantially horizontally positioned mould, a cylindrical core rotatably mounted in said mould, said mould having a longitudinally extending opening at its upwardly directed wall, a base structure supporting said mould, and a plurality of frames foldably connected to said base structure and designed to be closed to embrace said mould or opened to allow removal of the mould.

8. An apparatus for manufacturing hollow bodies of extended shape from a plastic material, comprising in combination a substantially horizontally positioned mould, a cylindrical core rotatably mounted centrally in said mould which surrounds said core so as to form a space thereabout, said mould having a longitudinally extending opening at its top upwardly directed wall, a cover adapted to engage said openings as a piston, means to operate said cover for effecting an extra pressure on the mass, a base structure supporting said mould, and a plurality of frames foldably connected to said base structure to embrace said mould.

9. An apparatus for manufacturing hollow bodies of extended shape from a plastic material, comprising in combination a substantially horizontally positioned mould, a cylindrical core rotatably mounted in the latter, said mould having a longitudinally extending opening at its top, a base structure supporting said mould, and a plurality of frames foldably mounted on said base structure to embrace said mould to hold same together.

10. An apparatus for manufacturing hollow bodies of extended shape from a plastic material, comprising in combination a substantially horizontally positioned core, a conically tapering mould surrounding said core so as to form a space thereabout, said mould having a longitudinally extending opening at its upwardly directed wall, a base structure supporting said mould, and a plurality of frames foldably mounted on said base structure to embrace said mould.

11. An apparatus for manufacturing hollow bodies of extended shape from a plastic material, comprising in combination a substantially horizontally positioned core, a mould surrounding said core, said mould having a longitudinally extending opening at its top, a base structure to support said mould, a plurality of frames carried by said base structure to embrace the mould, and means to effect a rotation of the core relatively to the mould.

12. An apparatus for manufacturing hollow bodies of extended shape from a plastic material, comprising in combination a substantially horizontally positioned core, a mould surrounding said core so as to form a space thereabout, said mould having a longitudinally extending opening at its top, means to effect a rotation of the core relative to the mould, and space blocks inserted in said space at any desirable place to hold the core in position relatively to the mould during said relative movement.

13. An apparatus for manufacturing hollow bodies of extended shape from a plastic material, comprising in combination a substantially horizontally positioned core, a mould surrounding said core so as to form a space thereabout, said mould having a longitudinally extending opening at its top, means for effecting a rotation of the core with respect to the mould, and space blocks inserted in said space at such distances apart as answer to the height of steps.

14. An apparatus for manufacturing hollow bodies of extended shape from a plastic material, comprising in combination a substantially horizontally positioned core, a mould surrounding said core so as to form a space thereabout, said mould having a longitudinally extending opening at its top, means for effecting a rotation of the core relative to the mould, and inwardly tapering space blocks inserted in the space between the core and the mould.

In testimony whereof we have signed our names.

TORE GUSTAF OLOF HYDÉN.
ERIK VALDEMAR CARLSSON.